PHOTOELECTRIC CELL COUPLING CIRCUIT

Filed Nov. 25, 1949

INVENTOR.
KURT SINGER
BY [signature]
ATTORNEY

Patented Feb. 10, 1953 2,628,317

UNITED STATES PATENT OFFICE 2,628,317

PHOTOELECTRIC CELL COUPLING CIRCUIT

Kurt Singer, North Hollywood, Calif., assignor to Radio Corporation of America, a corporation of Delaware Application November 25, 1949, Serial No. 129,480

5 Claims. (Cl. 250—209)

This invention relates to coupling circuits between photoelectric cells and an amplifier, and particularly relates to a coupling circuit in which the individual phototube outputs work into equal load impedances when connected in either a parallel or a push-pull arrangement.

The use of switching circuits for connecting photoelectric cells for the reproduction of a standard sound record or of a push-pull sound record are well-known, reference being made to Belar U. S. Patents No. 2,152,173 of March 28, 1939, and No. 2,178,219 of October 31, 1939, these circuits showing the output of the cells being connected to transformers, to a pair of push-pull amplifier tubes, and to a single amplifier tube. The present invention is directed to the same general type of circuit, but differs therefrom in that it embodies all of the advantageous features of the various circuits of the references when coupling the cells to an unbalanced line. For instance, the present invention provides the usual polarizing voltage adjustment on the cells in either parallel or push-pull connections, for obtaining the important unchanging alternating current balance for either type of connection. The present invention also provides the same load impedance for either a parallel or push-pull coupling, which provides the circuit with a constant high frequency response. The circuit is particularly useful in sound film reproduction or in a photoelectric cell monitoring system for a film recorder, wherein the photoelectric cell alternating current output balance can only be obtained through the application of a push-pull or phase opposition signal.

The principal object of the invention, therefore, is to facilitate the interconnection of a pair of photoelectric cells with an amplifier either in a parallel or a push-pull relationship.

Another object of the invention is to provide an improved switching circuit between a pair of photoelectric cells and a single ended line.

A further object of the invention is to provide a switching circuit between a pair of photoelectric cells and a single tube amplifier which permits switching the outputs of the cells from a parallel to a push-pull relationship or vice versa without changing the alternating current balance established prior to the switching operation.

A still further object of the invention is to provide an improved method of photoelectric cell coupling and switching which permits the obtaining of an alternating current output balance of the photoelectric cells by use of a balancing signal applied to the cells either in phase or in phase opposition.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
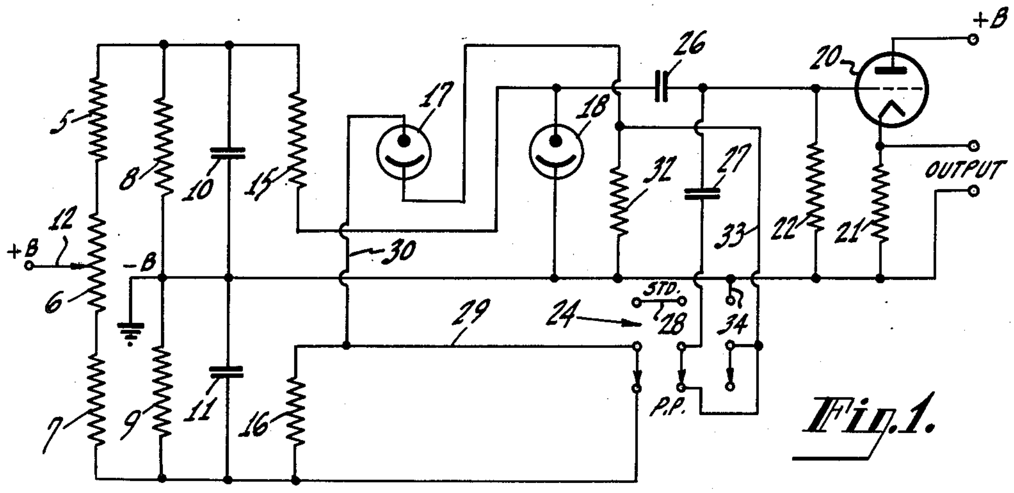
Fig. 1 is a schematic drawing of a circuit embodying the invention.

Referring now to the drawings, in which the same numerals identify like elements, a direct current potential dividing network includes resistors 5, 6, 7, 8, and 9, condensers 10 and 11, a potentiometer slider 12 being connected between resistor 6 and the B plus terminal. Loading resistors 15 and 16 are shown connected to the anodes of photoelectric cells 17 and 18 in Figs. 1 and 2, and which are, in turn, coupled to the grid of a cathode-follower amplifier tube 20 having its output over resistor 21. A terminating and grid return resistor is shown at 22.

By means of a triple pole, double throw switch 24, the photoelectric tubes 17 and 18 may be connected in parallel to the grid of the amplifier 20, or in a push-pull relationship. When switch 24 is thrown to its upper or standard position, the anode of photoelectric cell 18 is coupled by coupling condenser 26 to the grid of the tube 20, and the anode of photoelectric cell 17 is coupled to the grid of tube 20 over condenser 27, the center swinger of switch 24, the cross bar 28 of the switch, conductor 29, and conductor 30. In this position also, a third or cathode resistor 32 is shorted by conductor 33, the right-hand swinger of switch 24, and conductor 34, so that the circuit shown in Fig. 2 results. The simplicity and symmetry of the circuit is to be noted, these features providing a circuit which may be readily balanced.

Figure 3:
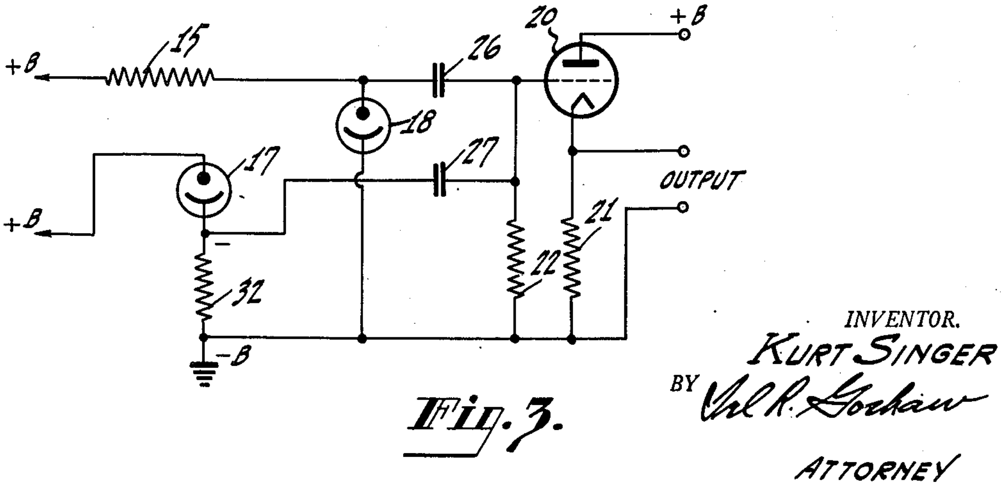
Fig. 3 is a simplified schematic diagram of the circuit of Fig. 1 showing the push-pull coupling.

When the switch 24 is thrown to its lower or push-pull position, the circuit of Fig. 3 is provided, since the left-hand swinger of switch 24 short-circuits resistor 16 and the coupling condenser 27 now connected to the cathode of the cell 17. The short-circuit is removed from resistor 32 to provide a load for the cathode of cell 17.

Figure 2:
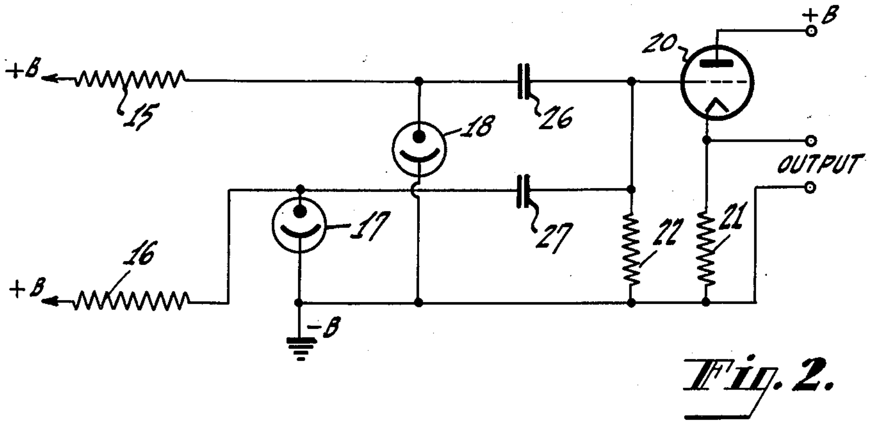
Fig. 2 is a simplified schematic diagram of the circuit of Fig. 1 showing the standard coupling.

As illustrated by the simplified circuits in Fig. 2, the standard circuit permits direct current potential to be varied on the anodes of cells 17 and 18, to provide an alternating current balance. With a transformer output, the signal output is low, the transformer is expensive, and neither the alternating current load nor the supply voltage direct current resistances stay the same when switching between the two positions. Other types of coupling circuits for unbalanced lines require a balance to be obtained by null indication only with the photoelectric cell switch in the push-pull position and by use of a standard signal. Application of a push-pull signal with the switch in the standard position does not permit of obtaining photoelectric cell output balance.

With the present circuit, a photoelectric cell balance by means of a true null indication can be obtained. Furthermore, the photoelectric cell balance does not change when the photoelectric cell switch is thrown into the standard or parallel position after a photoelectric cell balance has been obtained in the push-pull or phase opposition position and vice versa. Also, no variation in alternating current load resistance or supply voltage direct current resistance occurs regardless of photoelectric cell switch position, since resistance 16 is equal to resistance 32. Another advantage is that the photoelectric cell output is the same regardless of whether or not the photoelectric cell switch is in the standard or push-pull position. It is understood that with the photoelectric cell switch in the push-pull position, a push-pull signal is reproduced and with the photoelectric cell switch in the standard position, a standard signal is reproduced and that the cells 17 and 18 are gas cells which vary in sensitivity with variations in polarizing voltage.

I claim:

1. A photoelectric cell coupling circuit comprising a pair of photoelectric cells, an amplifier, means for adjusting the direct current potential on the anodes of said cells, a switching circuit, a pair of coupling elements connected to said amplifier, and switching means, one position of said switching means directly connecting through said switching circuit the anode of one of said cells to one of said coupling elements, the anode of the other of said cells being directly connected to said other coupling element, said switching means simultaneously connecting the cathodes of said cells together and to ground, and another position of said switching means disconnecting said anode of said one cell from said one coupling element and connecting the cathode of said one cell directly to said one coupling element.

2. A photoelectric cell coupling circuit in accordance with claim 1, in which said switching means is a triple pole, double throw switch and said switching circuit includes a resistor connected between the cathode of said one cell and ground when said cathode is connected to said one coupling element, said resistor being short-circuited when the anodes of said cells are connected to said respective coupling elements.

3. A photoelectric cell coupling circuit in accordance with claim 1, in which said amplifier is a cathode-follower.

4. A photoelectric cell coupling circuit, comprising a pair of photoelectric cells, an amplifier for amplifying the outputs of said cells, a switching circuit for connecting said cell outputs in parallel or in push-pull to said amplifier, coupling elements between said switching circuit and said amplifier, said elements including a pair of condensers, one of said condensers being fixedly connected between an anode of one of said cells and said amplifier, and a resistor connected between the cathode of one of said cells and ground, said switching circuit short-circuiting said resistor and connecting the other of said condensers between the anode of said other cell and said amplifier when said cell outputs are connected in parallel to said amplifier, and said switching circuit connecting said resistor between said cathode and said ground and connecting said other condenser between the cathode of said other cell and said amplifier when said cell outputs are connected in push-pull to said amplifier.

5. A photoelectric cell coupling circuit, comprising a pair of photoelectric cells, an amplifier for amplifying the outputs of said cells, a switching circuit for connecting said cell outputs in parallel or in push-pull to said amplifier, coupling elements between said switching circuit and said amplifier, a resistor connected between the cathode of one of said cells and ground, said switching circuit short-circuiting said resistor when said cell outputs are connected in parallel to said amplifier, said resistor being connected between said cathode and said ground when said cell outputs are connected in push-pull to said amplifier, and a pair of load resistors for said cells, one of said pair of resistors being short-circuited when said first mentioned resistor is connected between the cathode of one of said cells and said ground.

KURT SINGER.

REFERENCES CITED

The following references are of record in the file of this patent:

UNITED STATES PATENTS

| Number | Name | Date |
|---|---|---|
| 2,085,205 | Warncke | June 29, 1937 |
| 2,287,965 | Borberg | June 30, 1942 |
| 2,295,536 | Albersheim | Sept. 15, 1942 |
| 2,489,223 | Herbold | Nov. 22, 1949 |

FOREIGN PATENTS

| Number | Country | Date |
|---|---|---|
| 846,104 | France | May 27, 1939 |